(12) United States Patent
Park et al.

(10) Patent No.: US 11,462,784 B2
(45) Date of Patent: Oct. 4, 2022

(54) BATTERY MODULE COMPRISING MODULE HOUSING

(71) Applicant: LG Chem, Ltd., Seoul (KR)

(72) Inventors: Jin-Yong Park, Daejeon (KR); Kyung-Mo Kim, Daejeon (KR); Seung-Joon Kim, Daejeon (KR); Jeong-O Mun, Daejeon (KR); Eun-Ah Ju, Daejeon (KR); Ho-June Chi, Daejeon (KR); Hee-Jun Jin, Daejeon (KR)

(73) Assignee: LG Energy Solution, Ltd.

( * ) Notice: Subject to any disclaimer, the term of this patent is extended or adjusted under 35 U.S.C. 154(b) by 100 days.

(21) Appl. No.: 16/978,942

(22) PCT Filed: Aug. 26, 2019

(86) PCT No.: PCT/KR2019/010871
§ 371 (c)(1),
(2) Date: Sep. 8, 2020

(87) PCT Pub. No.: WO2020/060055
PCT Pub. Date: Mar. 26, 2020

(65) Prior Publication Data
US 2020/0411930 A1    Dec. 31, 2020

(30) Foreign Application Priority Data
Sep. 17, 2018    (KR) .................. 10-2018-0111056

(51) Int. Cl.
*H01M 10/6568* (2014.01)
*H01M 10/625* (2014.01)
(Continued)

(52) U.S. Cl.
CPC ..... *H01M 10/6568* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS 3,110,633 A * 11/1963 Bachmann ........ H01M 10/6556
219/202
2007/0259258 A1* 11/2007 Buck ................... H01M 10/625
429/120
(Continued)

FOREIGN PATENT DOCUMENTS

CN    205452392 U    8/2016
JP    2007305426 A    11/2007
(Continued)

OTHER PUBLICATIONS

Extended European Search Report for Application No. 19863854.6, dated Aug. 17, 2021, 12 pages.
(Continued)

*Primary Examiner* — Lisa S Park
(74) *Attorney, Agent, or Firm* — Lerner, David, Littenberg, Krumholz & Mentlik, LLP (57) ABSTRACT

A battery module, and a battery pack having a module housing capable of effectively increasing an energy density while enhancing the heat dissipation efficiency, includes a cell assembly having a plurality of secondary batteries; and a module housing having at least one sidewall and configured to accommodate the cell assembly in an inner space defined by the sidewall. The sidewall has at least one coolant flow path, and at least one injection hole is formed in an outer surface of the sidewall so as to extend to and communicate with the inner space.

11 Claims, 10 Drawing Sheets

(51) Int. Cl.
*H01M 10/613* (2014.01)
*H01M 10/653* (2014.01)
*H01M 10/6556* (2014.01)
*H01M 50/10* (2021.01)

(52) U.S. Cl.
CPC ..... *H01M 10/653* (2015.04); *H01M 10/6556* (2015.04); *H01M 50/10* (2021.01); *H01M 2220/20* (2013.01)

(56) References Cited

U.S. PATENT DOCUMENTS

| | | |
|---|---|---|
| 2010/0236854 A1 | 9/2010 | Nakamura |
| 2011/0244299 A1* | 10/2011 | Guener ............... B60L 50/64 429/120 |
| 2012/0009457 A1 | 1/2012 | Lee et al. |
| 2013/0207459 A1 | 8/2013 | Schroder et al. |
| 2014/0023894 A1 | 1/2014 | Jansen et al. |
| 2018/0026321 A1 | 1/2018 | Rhodes et al. |
| 2018/0076493 A1 | 3/2018 | Park et al. |
| 2018/0287112 A1* | 10/2018 | Juventin ............. H01M 10/425 |
| 2018/0366794 A1 | 12/2018 | Kim et al. |
| 2019/0044201 A1 | 2/2019 | Jo et al. |
| 2019/0051954 A1 | 2/2019 | Kim et al. |
| 2019/0131678 A1 | 5/2019 | Kim et al. |

FOREIGN PATENT DOCUMENTS

| | | |
|---|---|---|
| JP | 2009295381 A | 12/2009 |
| JP | 2015505142 A | 2/2015 |
| JP | 2015528189 A | 9/2015 |
| JP | 2015210895 A | 11/2015 |
| JP | 2015220176 A | 12/2015 |
| KR | 101112442 B1 | 2/2012 |
| KR | 20120062232 A | 6/2012 |
| KR | 20130123901 A | 11/2013 |
| KR | 20160105356 A | 9/2016 |
| KR | 20170019041 A | 2/2017 |
| KR | 20170019229 A | 2/2017 |
| KR | 20180047383 A | 5/2018 |
| KR | 20180084539 A | 7/2018 |
| KR | 20180084540 A | 7/2018 |
| WO | 2017025592 A1 | 2/2017 |
| WO | 2018070694 A1 | 4/2018 |

OTHER PUBLICATIONS

International Search Report for Application No. PCT/KR2019/010871 dated Dec. 27, 2019, 2 pages.
Partial European Search Report including Written Opinion for Application No. 19863854.6 dated May 14, 2021, 12 pages.

* cited by examiner

BATTERY MODULE COMPRISING MODULE HOUSING

CROSS-REFERENCE TO RELATED APPLICATIONS

The present application is a national phase entry under 35 U.S.C. § 371 of International Application No. PCT/KR2019/010871 filed Aug. 26, 2019, which claims priority from Korean Patent Application No. 10-2018-0111056 filed on Sep. 17, 2018, the disclosures of which are incorporated herein by reference.

TECHNICAL FIELD

The present disclosure relates to a battery module having a module housing in which a coolant flow path and an injection hole are formed, and more particularly, to a battery module and a battery pack having a module housing capable of effectively increasing an energy density while enhancing the heat dissipation efficiency.

BACKGROUND ART

Secondary batteries currently commercialized include nickel cadmium batteries, nickel hydrogen batteries, nickel zinc batteries, lithium secondary batteries and so on. Among them, the lithium secondary batteries are more prominent in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery exterior, hermetically containing the electrode assembly together with an electrolyte.

In recent years, secondary batteries have been widely used not only in small-sized devices such as portable electronic devices but also in medium-sized or large-sized devices such as vehicles and power storage devices. When the secondary batteries are used in medium-sized or large-sized devices, a large number of secondary batteries are electrically connected to increase capacity and power. In particular, secondary batteries are widely used for medium-sized or large-sized devices since they may be easily stacked.

Meanwhile, recently, as the need for a large-capacity structures increases along with utilization of battery packs as an energy storage source, the demand for a battery pack in which a plurality of battery modules, each having a plurality of secondary batteries connected in series and/or in parallel, increases.

Since battery packs including a plurality of battery modules are manufactured such that a plurality of secondary batteries are concentrated in a narrow space, it is important to easily dissipate heat generated from each secondary battery. Since the process of charging or discharging the secondary battery is performed by an electrochemical reaction as described above, the battery is affected by the ambient temperature condition.

For example, when the charge and discharge process is performed in a state exposed to a high temperature condition where the optimum temperature is not maintained, the charge and discharge efficiency of the battery may be lowered, thereby making it difficult to guarantee good performance for normal operation.

Thus, the conventional battery module separately includes a cooling member for cooling the heat generated in the process of producing electricity in the secondary battery in order to properly maintain the temperature of the secondary battery.

Figure 1:
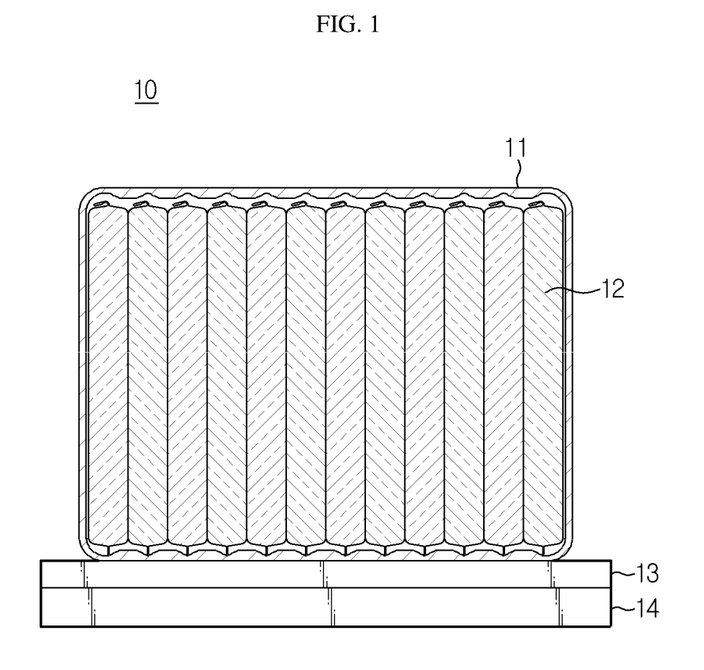
FIG. 1 is a cross-sectional view schematically showing a conventional battery module.

FIG. 1 is a cross-sectional view schematically showing a conventional battery module.

As shown in FIG. 1, in the conventional battery module 10 including a cooling member, a pack tray 13 made of a material with high thermal conductivity is installed at a lower surface of a module housing 11. That is, in the conventional art, the pack tray 13 absorbs heat generated from each secondary battery 12 of the cell assembly and transfers the absorbed heat to a heatsink 14 installed to be in contact with the lower portion of the pack tray 13. Then, the heatsink 14 is cooled again by a cooling water.

However, the conventional battery module includes a separate heatsink at the lower side or the upper side thereof. Thus, if the vertical height of the battery module is limited as in a vehicle, there is a limitation in the vertical space for the battery module, and accordingly there is a limit to increasing the energy density by enlarging of the battery module.

Further, in the conventional battery module, the heat generated from the secondary battery is transferred to the module housing first, the heat of the module housing is transferred to the pack tray again, and finally the heat is transferred to the heatsink. Thus, the heat is transferred via a conduction section composed of the various members, resulting in seriously deteriorated heat dissipation efficiency.

DISCLOSURE

Technical Problem

The present disclosure is designed to solve the problems of the related art, and therefore the present disclosure is directed to providing a battery module and a battery pack having a module housing capable of effectively increasing an energy density while enhancing the heat dissipation efficiency.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a cell assembly having a plurality of secondary batteries; and a module housing having at least one sidewall and configured to accommodate the cell assembly in an inner space defined by the sidewall, the sidewall having at least one coolant flow path, at least one injection hole being formed in an outer surface of the sidewall to be perforated to the inner space.

Here, the battery module may further comprise a thermally conductive material inserted through the injection hole and disposed between the cell assembly and an inner surface of the module housing in the inner space of the module housing.

Further, the sidewall may include an upper wall, a lower wall, a left wall and a right wall, the coolant flow path may be formed in at least one of the upper wall, the lower wall, the left wall and the right wall, and the injection hole may be formed together in at least one of the upper wall, the lower wall, the left wall and the right wall where the coolant flow path is formed.

In addition, the coolant flow path may be formed to pass through both front and rear ends of the sidewall of the module housing.

Further, the coolant flow path may have an inlet formed at a front end surface of the sidewall of the module housing so that a coolant flows in therethrough and an outlet formed at a rear end surface of the sidewall of the module housing so that the coolant flows out therethrough.

Also, a guide groove extending in a front and rear direction and indented into the sidewall may be formed at an inner surface of the sidewall.

Moreover, the battery module may further comprise a backflow prevention member located at an inner surface of the sidewall in which the injection hole is formed, the backflow prevention member having a cover configured to open the injection hole only in an inner direction.

In addition, a stopper for sealing the injection hole to prevent an external substance from entering the module housing may be further provided to the injection hole.

Further, two or more coolant flow paths may be formed at the sidewall. Also, a rib structure extending from an outer surface to an inner surface of the sidewall may be formed between the two or more coolant flow paths.

Also, two or more of the injection holes spaced apart from each other in a front and rear direction by a predetermined interval may be located at the rib structure.

Moreover, in another aspect of the present disclosure, there is also provided a battery pack, comprising two or more battery modules according to the present disclosure.

In addition, the two or more battery modules may be provided such that the coolant flow path of the module housing of one battery module and the coolant flow path of the module housing of another battery module are connected to each other.

Further, in another aspect of the present disclosure, there is also provided a vehicle, comprising the battery pack according to the present disclosure.

Advantageous Effects

According to an embodiment of the present disclosure, unlike the conventional art, the battery module may effectively discharge the heat of the cell assembly, without a heatsink for discharging the heat generated from the battery module, thereby reducing the manufacturing cost and decreasing the volume of the battery module. Moreover, in the present disclosure, the space where the heatsink is displaced may be utilized further, thereby allowing the accommodation of a cell assembly having a larger volume, thereby increasing the energy density.

In addition, according to an embodiment of the present disclosure, since an injection hole is formed in the sidewall having the coolant flow path, a thermally conductive material may be very easily injected into the sidewall at which the coolant flow path of the module housing is formed. In other words, in the present disclosure, it is very easy to minimize the heat transfer distance by which heat is discharged to the outside through the thermally conductive material. Accordingly, in the present disclosure, it is possible to provide a battery module with high cooling efficiency.

Also, according to an embodiment of the present disclosure, since a guide groove is formed at the inner surface of the sidewall where the coolant flow path of the module housing is formed, the guide groove guides a moving path of the thermally conductive material injected through the injection hole, thereby helping the thermally conductive material to spread evenly in the inner space of the module housing in the front and rear direction. Accordingly, the plurality of secondary batteries of the cell assembly may be uniformly cooled, thereby improving the life of the battery module and effectively reducing the failure rate caused by non-uniform injection of the thermally conductive material during the manufacturing process.

Moreover, according to an embodiment of the present disclosure, since a stopper for sealing the injection hole is provided, it is possible to effectively prevent the thermally conductive material injected into the injection hole from flowing out again through the injection hole or an external substance from entering the module housing through the injection hole. Accordingly, it is possible to prevent the thermally conductive material of the battery module from flowing backward through the injection hole and leaking out to cause a failure. Also, since an external substance is not introduced into the battery module, it is possible to prevent the battery module from operating abnormally.

In addition, according to an embodiment of the present disclosure, since the battery pack of the present disclosure includes a plurality of battery modules in which sidewalls of their module housings respectively have coolant flow paths, the coolant flow paths of the battery modules may be connected to each other, without a separate member, thereby reducing the manufacturing cost.

Further, according to another embodiment of the present disclosure, since the battery pack of the present disclosure includes a plurality of battery modules so that sidewalls of their module housings respectively having coolant flow paths are connected to each other, without a separate member, the coolant flow paths of the battery modules may be connected to each other, thereby reducing the manufacturing cost.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but rather interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustration only, not intended to limit the scope of the disclosure, so it should be understood that other equivalents and modifications could be made thereto without departing from the scope of the disclosure.

Figure 2:
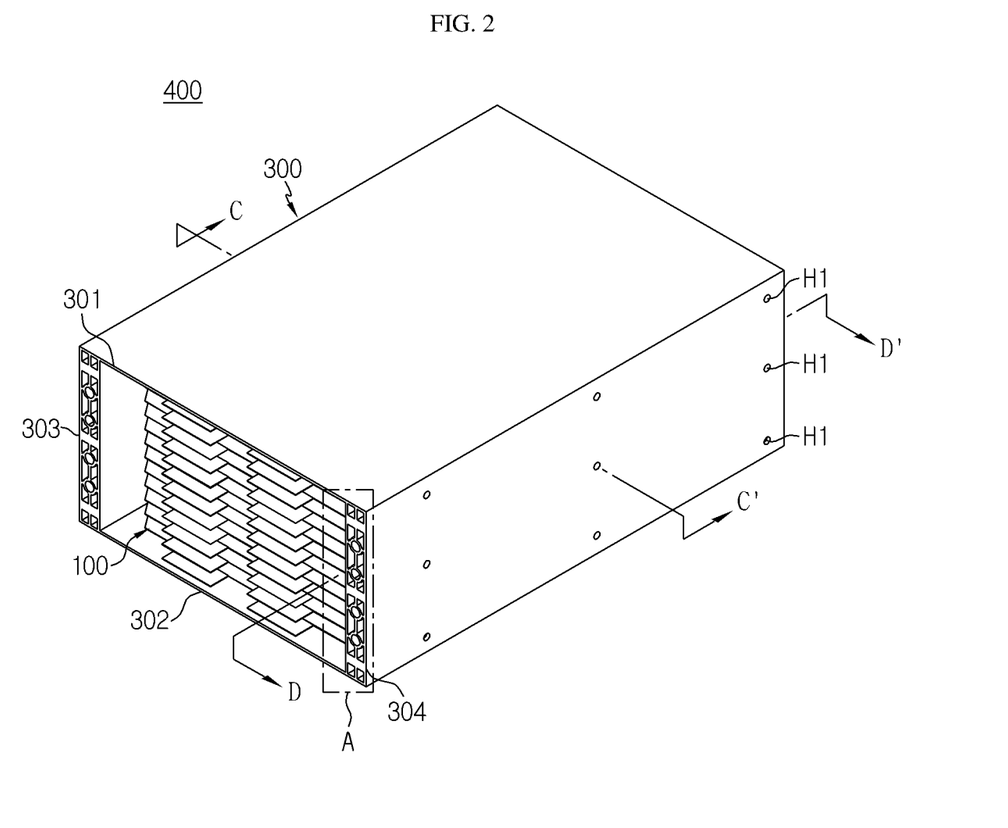
FIG. 2 is a perspective view schematically showing a battery module according to an embodiment of the present disclosure.

FIG. 2 is a perspective view schematically showing a battery module according to an embodiment of the present disclosure. In addition, FIG. 3 is a perspective view schematically showing a cell assembly, employed in the battery module according to an embodiment of the present disclosure.

Figure 3:
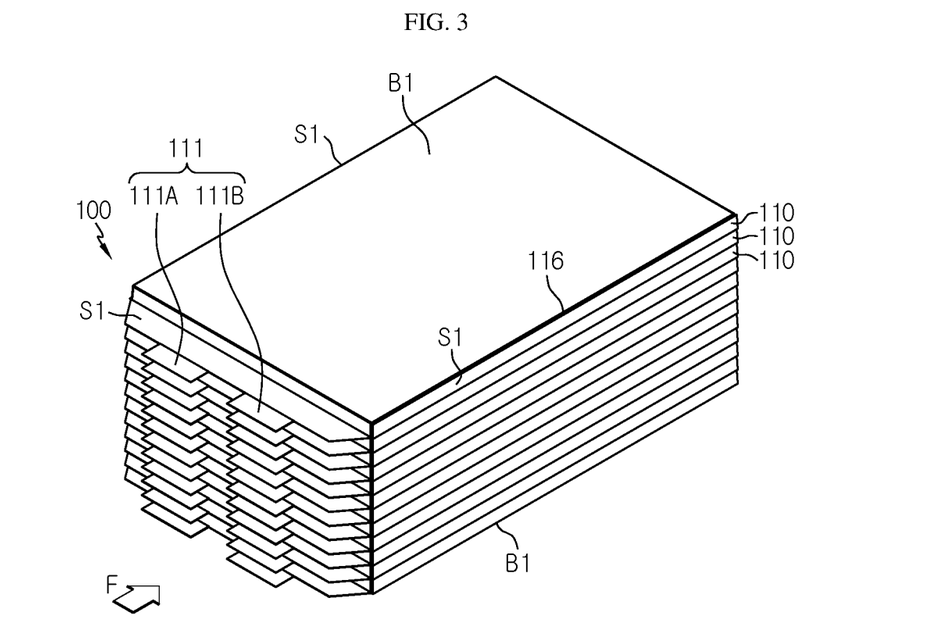
FIG. 3 is a perspective view schematically showing a cell assembly, employed in the battery module according to an embodiment of the present disclosure.

Referring to FIGS. 2 and 3, a battery module 400 according to the present disclosure may include a cell assembly 100 and a module housing 300.

Specifically, the cell assembly 100 may include a plurality of secondary batteries 110. In this case, the secondary battery 110 may be a pouch-type secondary battery 110. In particular, the pouch-type secondary battery 110 may include an electrode assembly (not shown), an electrolyte (not shown) and a pouch exterior 116.

Here, the electrode assembly may be configured such that at least one positive electrode plate and at least one negative electrode plate are disposed with a separator being interposed therebetween. More specifically, the electrode assembly may be classified into a winding type in which one positive electrode plate and one negative electrode plate are wound together with a separator, a stack type in which a plurality of positive electrode plates and a plurality of negative electrode plates are alternately stacked with a separator being interposed therebetween, and the like.

In addition, the pouch exterior 116 may be configured to have an outer insulating layer, a metal layer and an inner adhesive layer. The pouch exterior 116 may include a metal thin film such as an aluminum thin film to protect internal components such as the electrode assembly and the electrolyte, complement the electrochemical properties of the electrode assembly and the electrolyte, and improve the heat dissipation properties. In addition, the aluminum thin film may be interposed between insulating layers formed of an insulating material in order to secure electrical insulation between components inside the secondary battery 110 such as the electrode assembly and the electrolyte or from other components outside the secondary battery 110.

In particular, the pouch exterior 116 may have two pouches, at least one of which may be formed to have a concave inner space. Also, the electrode assembly may be accommodated in the inner space of the pouch. In addition, sealing portions may be provided on outer circumferential surfaces of the two pouches such that the sealing portions are fused to each other, thereby sealing the inner space in which the electrode assembly is accommodated.

Each pouch-type secondary battery 110 may include an electrode lead 111, and the electrode lead 111 may include a positive electrode lead and a negative electrode lead.

More specifically, the electrode lead 111 may be configured to protrude forward or backward from the sealing portion located at an outer periphery of the front or rear side of the pouch exterior 116. In addition, the electrode lead 111 may function as an electrode terminal of the secondary battery 110. For example, as shown in FIG. 3, an electrode lead 111A of the positive electrode and an electrode lead 111B of the negative electrode may protrude forward from the secondary battery 110.

Thus, according to this configuration of the present disclosure, in one secondary battery 110, there is no interference between the positive electrode lead 111A and the negative electrode lead 111B, thereby increasing the area of the electrode lead 111. Also, a welding process or the like may be performed more easily between the electrode lead 111 and a bus bar (not shown).

Meanwhile, the plurality of pouch-type secondary batteries 110 may be included in the battery module 400 to be stacked in at least one direction. For example, as shown in FIG. 3, the plurality of pouch-type secondary batteries 110 may be configured to be stacked side by side in a vertical direction. At this time, each pouch-type secondary battery 110 may be arranged in the form of lying substantially in parallel to the ground such that, when viewed in the F direction, two wide surfaces B1 thereof are located on an upper side and a lower side and the sealing portions S1 are located in the horizontal direction.

Meanwhile, the terms indicating directions such as front, rear, left, right, upper and lower, used in this specification, may vary depending on the position of an observer or the shape of an object. However, in this specification, for convenience of description, the references to front, rear, left, right, upper and lower directions are based on the case where the cell assembly is viewed in the F direction.

The configuration of the pouch-type secondary battery 110 described above is obvious to those skilled in the art and thus will not be explained in detail. In addition, in the cell assembly 100 according to the present disclosure, various types of secondary batteries 110 known at the time of filing this application may be employed.

Meanwhile, referring to FIGS. 1 and 2 again, the module housing 300 may function as an exterior material in the battery module 400. Accordingly, the module housing 300 provides structural stability to the battery module 400 and protects components accommodated in the cell assembly 100 from external physical elements such as impact or material. To this end, the module housing 300 may be made of a metal material such as steel or aluminum.

In particular, if the module housing 300 is made of a metal material including aluminum, the heat generated from the cell assembly 100 may be effectively discharged out of the module housing 300 by using the high thermal conductivity of aluminum.

In addition, the module housing 300 may include at least one sidewall 301, 302, 303, 304.

Specifically, a plurality of sidewalls 301, 302, 303, 304 are provided, the plurality of sidewalls 301, 302, 303, 304 may be connected to each other. For example, the sidewalls 301, 302, 303, 304 may include an upper wall 301, a lower wall 302, a left wall 303 and a right wall 304, when viewed in the F direction. Also, the sidewalls 301, 302, 303, 304 may be connected to each other.

In addition, the module housing 300 may have an inner space defined by the sidewalls 301, 302, 303, 304 to accommodate the cell assembly 100. Specifically, the inner space may have an inner structure corresponding to the outer shape of the cell assembly 100.

For example, as shown in FIGS. 2 and 3, the upper wall 301 and the lower wall 302 of the module housing 300 are connected to the left wall 303 and the right wall 304 perpendicularly so that the cell assembly 100 having an approximate rectangular parallelepiped shape as a whole is accommodated in the module housing 300.

Further, the inner space may be provided such that at least one of the upper wall 301, the lower wall 302, the left wall 303 and the right wall 304 of the module housing 300 is in contact with at least one outer surface of the cell assembly 100.

That is, as the area where the sidewalls 301, 302, 303, 304 of the module housing 300 directly contact the outer surface of the cell assembly 100 increases, the heat generated in the cell assembly 100 may be more effectively conducted to the module housing 300. For example, as shown in FIG. 3, the sidewalls 301, 302, 303, 304 of the module housing 300 may be formed such that the upper and lower surfaces of the cell assembly 100 contact the upper wall 301 and the lower wall 302.

In addition, the module housing 300 may be configured in a hollow structure in which the inner space is opened at both sides (in the front and rear direction). Specifically, the hollow structure may be configured such that the inner space is opened along the arrangement direction of the battery modules 400 when the plurality of battery modules 400 are arranged in the front and rear direction.

More specifically, the module housing 300 may include a mono frame where the upper wall 301, the lower wall 302, the left wall 303 and the right wall 304 are integrated. The module housing 300 of the mono frame may be formed by extrusion molding. Here, the integrated form means a single body formed using a casting method or the like. Specifically, the module housing 300 may have a structure in which both ends of the upper wall 301, the lower wall 302, the left wall 303 and the right wall 304 are connected to each other.

For example, as shown in FIG. 2, the module housing 300 may have a rectangular tubular shape in which the front and rear sides are opened and both ends of the upper wall 301, the lower wall 302, the left wall 303 and the right wall 304 are connected to each other.

Figure 4:
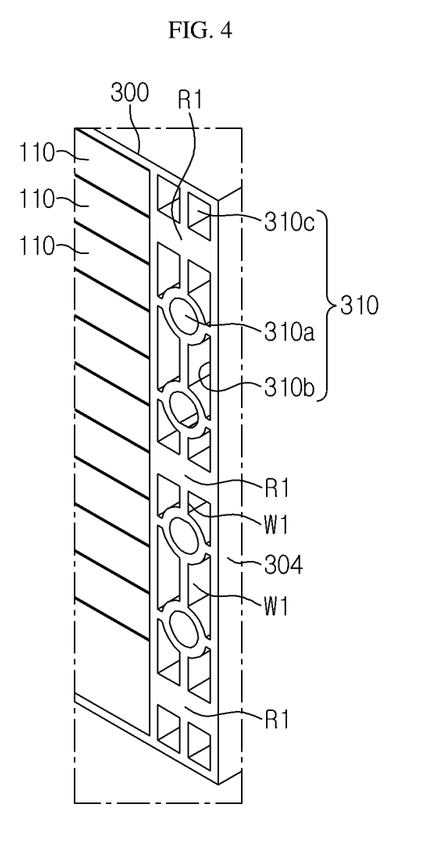
FIG. 4 is a partially enlarged front view schematically showing a region A of the battery module of FIG. 2.

FIG. 4 is a partially enlarged front view schematically showing a region A of the battery module of FIG. 2.

Referring to FIG. 4 along with FIG. 2, at least one coolant flow path 310 may be formed at the sidewalls 301, 302, 303, 304 of the module housing 300.

Specifically, the coolant flow path 310 may be configured to allow a coolant such as a coolant or air to move therethrough. Here, the cooling fluid may be circulated from a separate circulation supply device (not shown) connected to the coolant flow path 310 of the module housing 300.

Further, at least one coolant flow path 310 may be formed in at least one of the plurality of sidewalls 301, 302, 303, 304 of the module housing 300. For example, as shown in FIG. 2, three coolant flow paths 310 may be formed in each of the left wall 303 and the right wall 304.

However, as the number of coolant flow paths 310 formed at each of the sidewalls 301, 302, 303, 304 increases, the cooling effect of the cell assembly 100 increases. However, when too many coolant flow paths 310 are formed, the durability of the module housing 300 is deteriorated. Thus, the number of coolant flow paths 310 may be appropriately set according to the material, configuration, shape, or the like of the module housing 300.

Moreover, the sidewalls 301, 302, 303, 304 may have at least one of a hollow coolant flow path 310c with a rectangular cross section, a hollow coolant flow path 310b with a curved and straight cross section, and a hollow coolant flow path 310a with a tubular shape.

For example, as shown in FIG. 4, the right wall 304 of the module housing 300 may have four hollow coolant flow paths 310c with a rectangular vertical cross section, twelve hollow coolant flow paths 310b with a curved and straight vertical cross section lines, and four hollow coolant flow paths 310a with a round tubular shape. Likewise, the left wall 303 of the module housing 300 may have the coolant flow paths 310a, 310b, 310c as described above. Also, a partition wall W1 may be formed to partition the coolant flow paths 310a, 310b, 310c from each other.

In addition, the coolant flow path 310 may be formed to pass linearly through both front and rear ends of the sidewalls 303, 304 of the module housing 300. Further, the coolant flow path 310 may have an inlet formed at an front end surface of the sidewalls 303, 304 of the module housing 300 so that a coolant flows in therethrough, and an outlet formed at a rear end surface of the sidewalls 303, 304 of the module housing 300 so that the coolant flows out therethrough.

Thus, according to this configuration of the present disclosure, even without a separate heatsink (a cooling member) for discharging the heat generated from the battery module 400, it is possible to effectively discharge the heat of the cell assembly 100, thereby reducing the manufacturing cost and decreasing the volume of the battery module 400. Moreover, in the present disclosure, since the heatsink may be excluded, more installation space may be utilized, thereby allowing the accommodation of a cell assembly with a greater volume and increased energy density.

Figure 5:
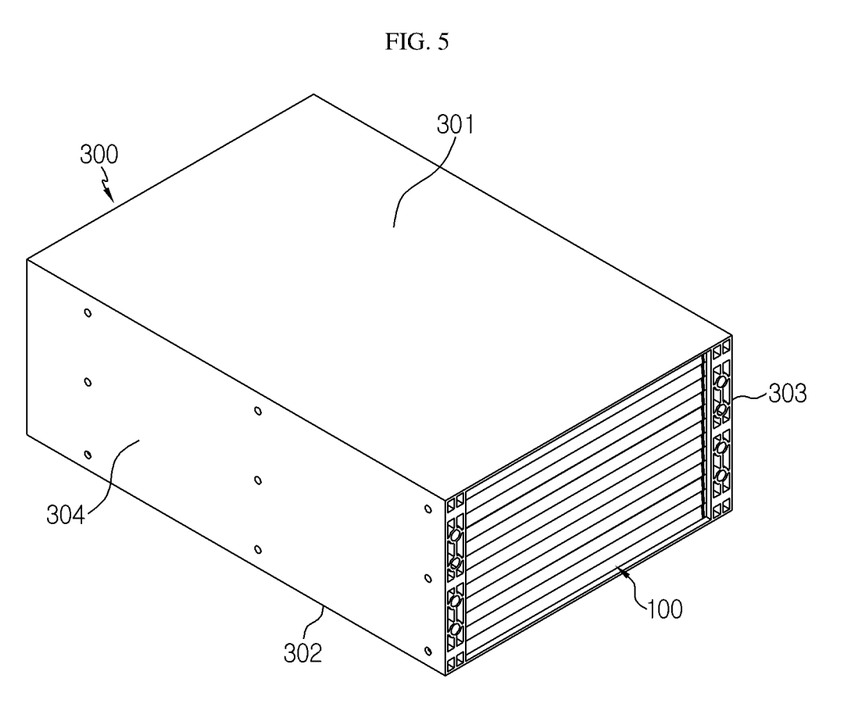
FIG. 5 is a rear perspective view schematically showing a module housing, employed in the battery module according to an embodiment of the present disclosure.

FIG. 5 is a rear perspective view schematically showing a module housing, employed in the battery module according to an embodiment of the present disclosure.

Referring to FIG. 5 along with FIG. 2, at least one injection hole H1 perforated to the inner space may be formed in an outer surface of at least one of the sidewalls 301, 302, 303, 304 of the module housing 300. Specifically, the injection hole H1 may be in the form of a circular opening.

In addition, the injection hole H1 may be formed such that a nozzle 500 configured to inject a thermally conductive material 320 into the module housing 300 is inserted therein.

In this case, a supply hose 510 connected to a supply device may be connected to one end of the nozzle 500 to supply the thermally conductive material 320. Further, the injection hole H1 may be located between the coolant flow path 310 located at an upper side and the coolant flow path 310 located at a lower side. In addition, the injection hole H1 may have a tubular shape perforated with a predetermined diameter.

Figure 6:
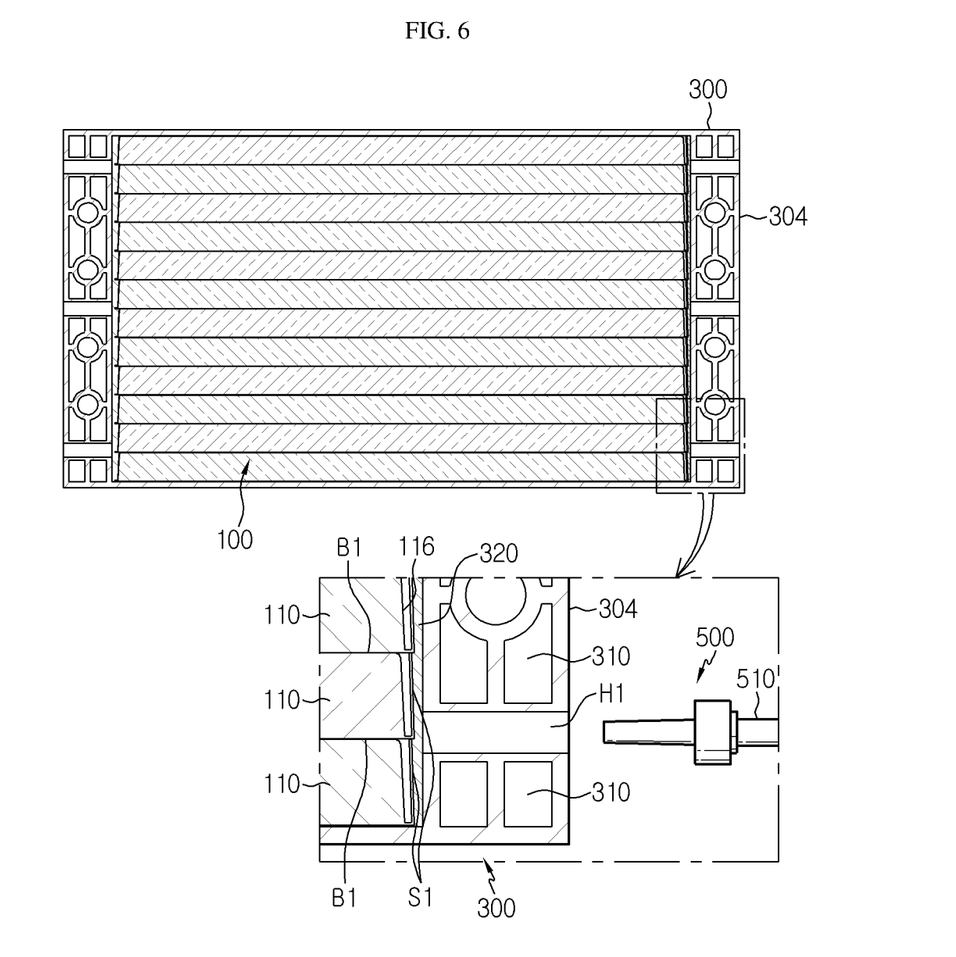
FIG. 6 is a partially enlarged cross-sectional view schematically showing the battery module, taken along the line C-C' of FIG. 2.

For example, as shown in FIG. 2, nine injection holes H1 may be formed in the right wall 304 of the module housing 300. Also, for example, as shown in FIG. 5, nine injection holes H1 may be formed in the left wall 303 of the module housing 300. Moreover, as shown in FIG. 6, the injection hole H1 formed in the module housing 300 may be perforated inward from the outer surface of the sidewall 304 to the inner space.

Further, the internal structure of an injection hole (not shown) according to another embodiment of the present disclosure may have a shape corresponding to the appearance of the nozzle 500. For example, if the outer shape of the nozzle 500 has a tubular diameter gradually decreasing toward an end thereof, the internal structure of the injection hole may have a tubular shape with a diameter gradually decreasing in the inner direction.

Thus, according to this configuration of the present disclosure, if the internal structure of the injection hole H1 of the module housing 300 is formed in a shape corresponding to the appearance of the nozzle 500, the nozzle 500 may be inserted into the injection hole H1 such that the outer surface of the nozzle 500 is in close contact with the internal structure of the injection hole H1. Thus, the injection pressure of the nozzle 500 does not leak through a gap between the injection hole H1 and the outer shape of the nozzle 500, so that the nozzle 500 may stably inject the thermally conductive material 320 at a constant injection rate through the injection hole H1.

Meanwhile, referring to FIG. 1 again, in the conventional art, when the battery module 10 (FIG. 1) includes a heatsink 14 separately at the outside of the module housing 11, the heatsink 14 must to be attached to the outer surface of the module housing 11 or pack tray 13. However, in order to inject a thermally conductive material into the module housing 11 in a state where the cell assembly is included in the module housing 11, the thermally conductive material must be injected through another part of the module housing 11 where the heatsink 14 is not attached. For this reason, in the conventional art, it is very difficult to inject the thermally conductive material along a minimized heat transfer distance between the heatsink 14 and the cell assembly.

Thus, according to this configuration of the present disclosure, by forming the injection hole H1 in the sidewall 304 at which the coolant flow path 310 is formed, the thermally conductive material 320 may be very easily injected through the sidewall 304 of the module housing 300 at which the coolant flow path 310 is formed. Accordingly, in the present disclosure, it may be very easy to minimize the heat transfer distance along which heat is discharged out through the thermally conductive material 320. In addition, the present disclosure may provide a battery module 400 with improved cooling efficiency.

FIG. 6 is a partially enlarged cross-sectional view schematically showing the battery module, taken along the line C-C' of FIG. 2.

Referring to FIG. 6 along with FIG. 2, the battery module 400 of the present disclosure may further include a thermally conductive material 320 in the inner space of the module housing 300. In addition, the thermally conductive material 320 may be inserted between the cell assembly 100 and the inner surface of the sidewall 304 of the module housing 300.

At this time, the plurality of pouch-type secondary batteries 110 of the cell assembly 100 may be stacked so as to lie substantially parallel to the ground such that, when viewed in the F direction, two wide surfaces B1 are located at an upper side and a lower side, respectively, and the sealing portion S1 is located in the horizontal direction (the left and right direction). Accordingly, the thermally conductive material 320 may be inserted between the sealing portion S1 and the inner surface of the module housing 300 in the horizontal direction of the plurality of secondary batteries 110.

In other words, because the efficiency of transferring heat to the outside in the case where the thermally conductive material 320 is in contact with the sealing portions S1 at the upper and lower sides of the pouch exterior 116 is better than the efficiency of transferring heat to the outside in the case where the thermally conductive material 320 is in contact with the sealing portions S1 located in the horizontal direction of the pouch exterior 116, as described above, it may be more preferable that the thermally conductive material 320 is inserted between the sealing portion S1 located in the horizontal direction of the plurality of secondary batteries 110 and the inner surface of the sidewall 304 of the module housing 300.

Here, the thermally conductive adhesive 320 may include a polymer resin, a silicon-based resin and a filler with high thermal conductivity. For example, the polymer resin may be a poly siloxane resin, a polyamide resin, a urethane resin or an epoxy resin.

Figure 7:
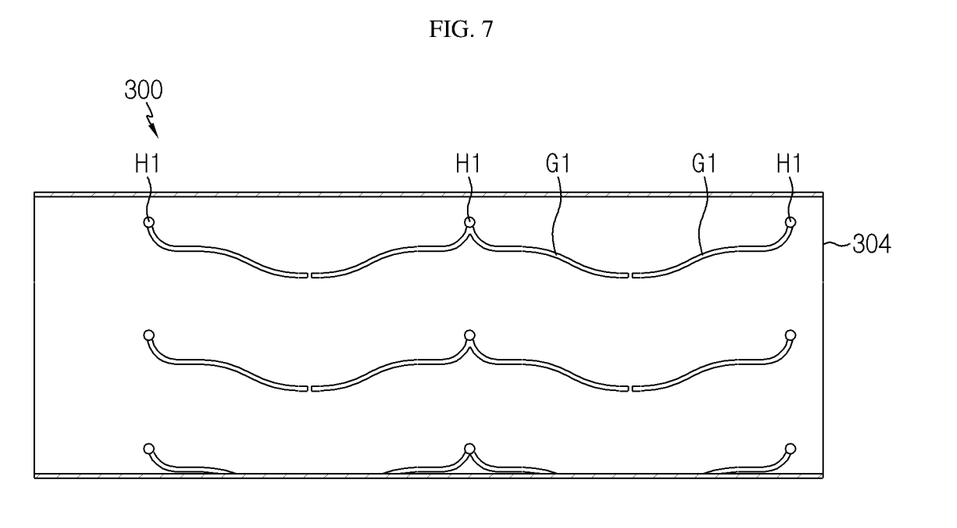
FIG. 7 is a cross-sectional view schematically showing the module housing of the battery module, taken along the line D-D' of FIG. 2.

FIG. 7 is a cross-sectional view schematically showing the module housing of the battery module, taken along the line D-D' of FIG. 2.

Referring to FIG. 7 along with FIG. 2, a guide groove G1 indented into the sidewall 304 may be formed at the inner surfaces of the sidewalls 303, 304 in which the injection hole H1 is formed. Specifically, the guide groove G1 may extend in the front and rear direction so that the thermally conductive material 320 (FIG. 6) injected into the injection hole H1 at the inner surface of the sidewall 304 is moved in the front and rear direction along the inner surface of the sidewall 304.

For example, the guide groove G1 may extend with a slope inclined downward. Alternatively, the guide groove G1 may have a curved shape extending in the front and rear direction. However, the guide groove G1 is not necessarily limited to the above shapes but may have any shape as long as the thermally conductive material 320 (FIG. 6) may spread evenly in the front and rear direction through the guide groove G1. For example, the guide groove G1 may have a curved shape extending in the front and rear direction from the injection hole H1 formed in the inner surface of the right wall 304.

Thus, according to this configuration of the present disclosure, since the guide groove G1 is formed at the inner surfaces of the sidewalls 303, 304 at which the coolant flow path 310 of the module housing 300 is formed, the guide groove G1 guides a moving path of the thermally conductive material 320 injected through the injection hole H1, thereby helping the thermally conductive material 320 to be spread evenly in the front and rear direction in the inner space of the module housing 300. Accordingly, since the plurality of secondary batteries 110 of the cell assembly 100 may be uniformly cooled, the life of the battery module 400 (FIG. 2) may be improved, and during manufacturing, a failure rate caused by an uneven injection state of the thermally conductive material 320 may be effectively reduced.

Figure 8:
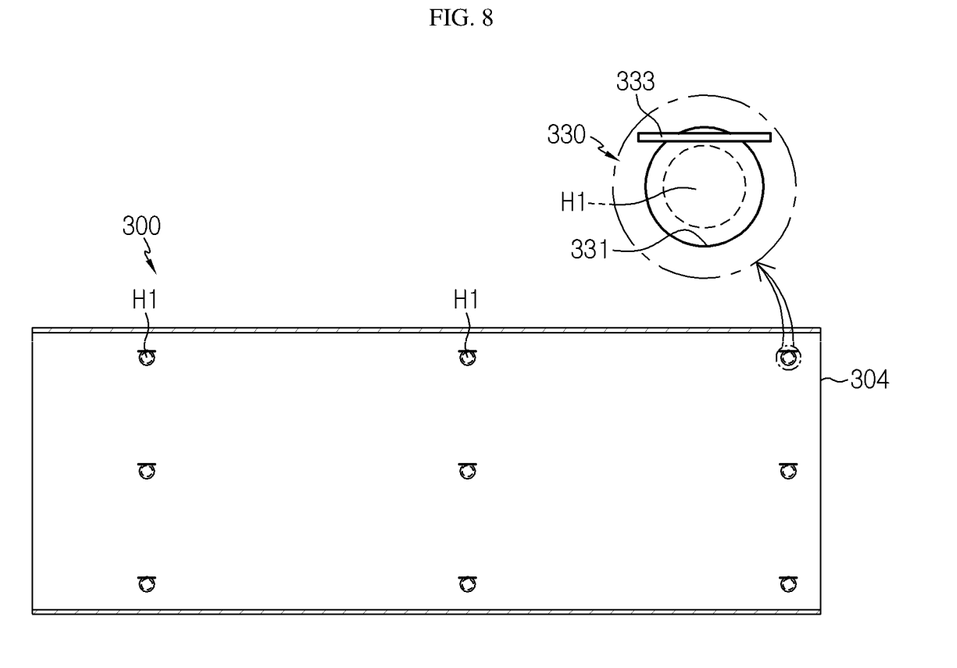
FIG. 8 is a cross-sectional view schematically showing a module housing of a battery module according to another embodiment of the present disclosure.

FIG. 8 is a cross-sectional view schematically showing a module housing of a battery module according to another embodiment of the present disclosure.

Referring to FIG. 8 along with FIG. 2, the battery module 400 of the present disclosure may further include a backflow prevention member 330 having a cover that opens the injection hole H1 only in an inner direction. In addition, the backflow prevention member 330 may be located at the inner surface of the sidewall 304 to cover the injection hole H1 formed in the inner surface of the sidewall 304.

For example, the backflow prevention member 330 may include a cover film 331 formed with a size to cover the injection hole H1 and a fixing member 333 for fixing the cover film 331 to the inner surface of the sidewall 304 of the module housing 300. More specifically, the fixing member 333 may be an adhesive tape.

For example, as shown in FIG. 8, nine injection holes H1 may be formed in the inner surface of the sidewall 304 of the module housing 300. In addition, the backflow prevention member 330 may be attached to each of the nine injection holes H1. Here, the backflow prevention member 330 may include the cover film 331 covering the injection hole H1 and an adhesive tape serving as the fixing member 333 for fixing the cover film 331 to the inner surface of the sidewall 304.

Figure 9:
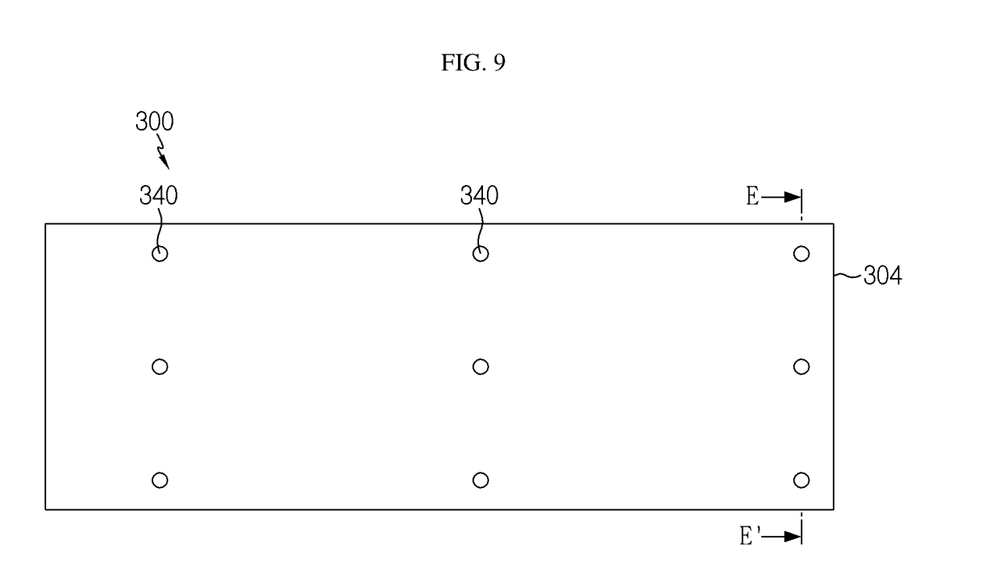
FIG. 9 is a side view schematically showing a module housing, employed in the battery module according to still another embodiment of the present disclosure.

FIG. 9 is a side view schematically showing a module housing, employed in the battery module according to still another embodiment of the present disclosure. In addition, FIG. 10 is an enlarged, partial cross-sectional view schematically showing the module housing of the battery module, taken along the line E-E' of FIG. 9.

Figure 10:
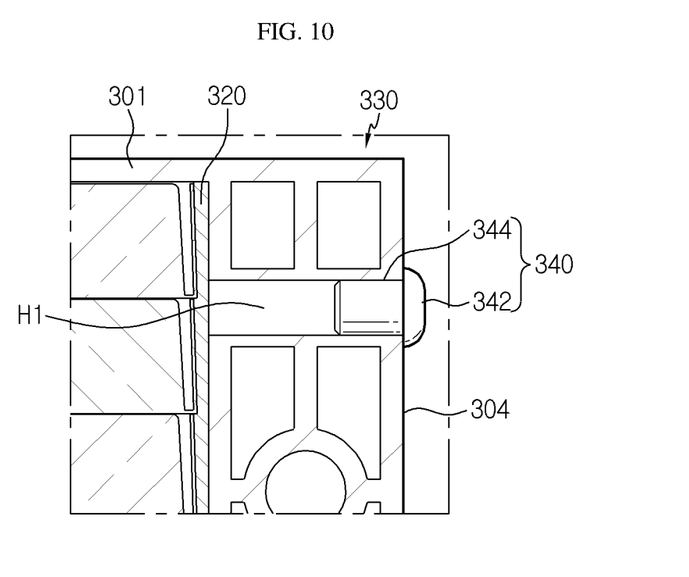
FIG. 10 is an enlarged, partial cross-sectional view schematically showing the module housing of the battery module, taken along the line E-E' of FIG. 9.

Referring to FIGS. 9 and 10 along with FIG. 2, a stopper 340 for sealing the injection hole H1 may be further provided to the injection hole H1 of the module housing 300. Specifically, the stopper 340 may be configured to seal the injection hole H1 in order to prevent the thermally conductive material 320 injected into the injection hole H1 from leaking out again through the injection hole H1 or an external substance enters the module housing 300 through the injection hole H1.

More specifically, the stopper 340 may include a cover portion 342 in the form of a circular flat plate to cover the injection hole H1, and an insert portion 344 extending inward at the inside of the cover portion 342 and inserted into the hollow structure of the injection hole H1.

For example, as shown in FIG. 9, nine stoppers 340, each having a cover portion 342 in the form of a circular flat plate to seal the injection hole H1 and an insert portion 344 extending inward at the inside of the cover portion 342 and inserted into the hollow structure of the injection hole H1, may be formed at the nine injection holes H1 formed in the sidewall 304 of the module housing 300, respectively.

Thus, according to this configuration of the present disclosure, since the stopper 340 is provided to seal the injection hole H1, in the present disclosure, it is possible to effectively prevent the thermally conductive material 320 injected into the injection hole H1 from leaking out again through the injection hole H1 or an external substance enters the module housing 300 through the injection hole H1. Accordingly, it is possible to prevent the thermally conductive material 320 of the battery module 400 from flowing backward through the injection hole H1 and leaking out to case a failure. In addition, since an external substance does not enter the battery module 400, it is possible to prevent the battery module 400 from abnormally operating.

Meanwhile, referring to FIGS. 2 and 4 again, two or more coolant flow paths 310 may be formed in at least one of the sidewalls 301, 302, 303, 304 of the module housing 300. In addition, a rib structure R1 extending from an outer surface to an inner surface of the sidewall 304 may be formed between the two or more coolant flow paths 310.

Specifically, the rib structure R1 may be a portion continuously connected from the outer surface of each of the sidewalls 303, 304 of the module housing 300 to the inner surface of each of the sidewalls 303, 304. Moreover, the rib structure R1 may be extended in the front and rear direction in a block form to a front end and a rear end of the module housing 300. In addition, the rib structure R1 may be formed at a position where the injection hole H1 needs to be formed in the sidewalls 303, 304 of the module housing 300, among positions thereof in the vertical direction. That is, two or more injection holes H1 spaced at regular intervals in the front and rear direction may be formed in the rib structure R1.

Thus, according to this configuration of the present disclosure, the rib structure R1 formed in at least one of the sidewalls 303, 304 of the module housing 300 may reinforce the rigidity of the module housing 300. In addition, the rib structure R1 may secure a sidewall portion in which the injection hole H1 is to be formed, so that the injection hole H1 is appropriately formed without interfering with the space of the coolant flow path 310. Accordingly, in the battery module 400 of the present disclosure, the thermally conductive material 320 may be evenly inserted in an easy way between the cell assembly accommodated in the module housing 300 and the sidewall of the module housing 300 at which the coolant flow path 310 is formed. For this reason, it is possible to effectively enhance the cooling efficiency of the cell assembly 100 and maximize the efficiency of the manufacturing process.

Figure 11:
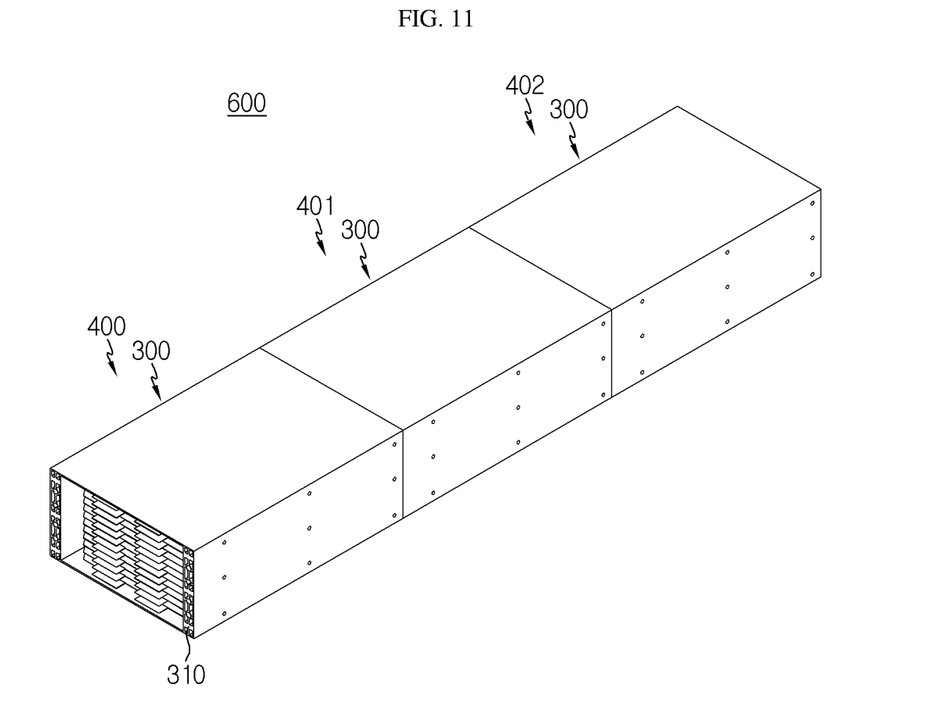
FIG. 11 is a perspective view schematically showing a battery pack including two or more battery modules according to an embodiment of the present disclosure.

FIG. 11 is a perspective view schematically showing a battery pack including two or more battery modules according to an embodiment of the present disclosure.

Referring to FIG. 11, a battery pack 600 according to the present disclosure may include two or more battery modules 400, 401, 402 according to the present disclosure. Specifically, in the two or more battery modules 400, 401, 402, the coolant flow path 310 of the module housing 300 of one battery module 400 and a coolant flow path (not shown) of the module housing 300 of another battery module 401 may be connected to each other.

That is, in the battery pack 600 of the present disclosure, the sidewalls 303, 304 of one module housing 300 and the sidewalls 303, 304 of another module housing 300 may be connected to each other by welding so that the coolant flow paths 310 of the plurality of battery modules 400 are connected to each other. In this case, the coolant flow paths 310 respectively formed at the sidewalls 303, 304 of the module housing 300 may be welded to the coolant flow paths 310 respectively formed at the sidewalls 303, 304 of another module housing 300 to prevent leakage therebetween.

For example, as shown in FIG. 11, in the battery pack 600 of the present disclosure, the sidewalls 303, 304 of one module housing 300 and the sidewalls 303, 304 of another module housing 300 may be bonded to each other by welding so that the coolant flow paths 310 of the two battery modules 400 are connected to each other.

Accordingly, according to this configuration of the present disclosure, since the battery pack 600 of the present disclosure includes a plurality of battery modules 400 so that the sidewalls 303, 304 of the module housings 300 at which the coolant flow paths 310 are formed are connected to each other, the coolant flow paths 310 of different battery modules 400 may be connected without a separate member, thereby reducing the manufacturing cost.

Figure 12:
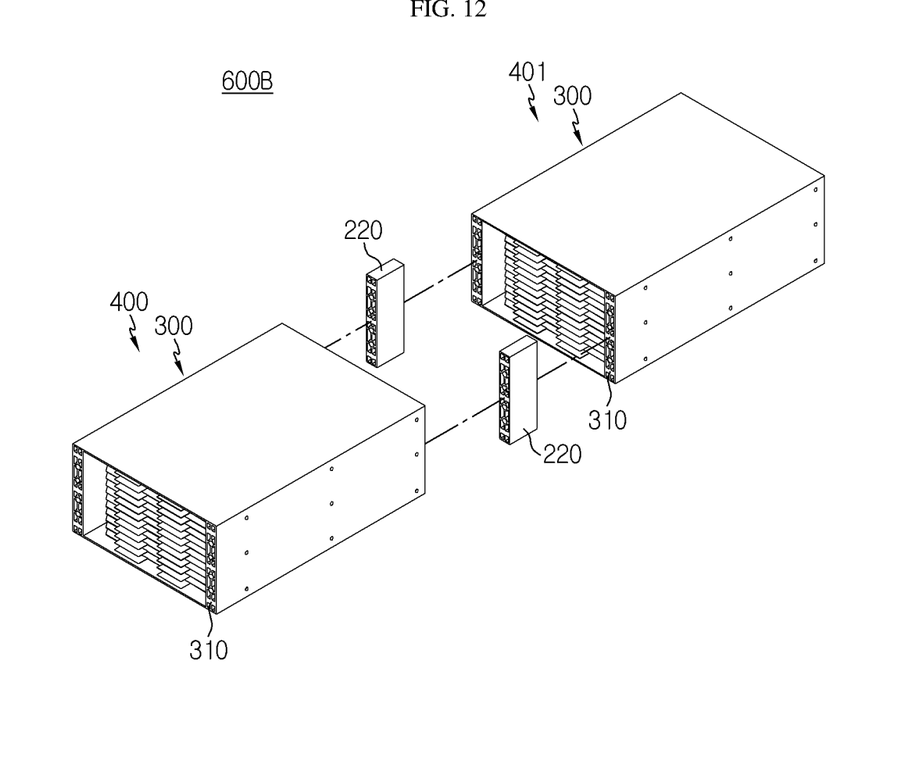
FIG. 12 is a perspective view schematically showing a battery pack including two or more battery modules according to another embodiment of the present disclosure.

FIG. 12 is a perspective view schematically showing a battery pack including two or more battery modules according to another embodiment of the present disclosure.

Referring to FIG. 12, a battery pack 600B according to another embodiment of the present disclosure may further include a flow path connection member 220 to connect the coolant flow path 310 of the module housing 300 of one battery module 400 and the coolant flow path 310 of the module housing 300 of another battery module 400 to each other, among the two or more battery modules 400. In addition, the flow path connection member 220 may be interposed between the module housing 300 of one battery module 400 and the module housing 300 of another battery module 401 among the two or more battery modules 400, 401.

For example, as shown in FIG. 12, two flow path connection members 220 may be interposed between two battery modules 400. In addition, each of the two flow path connection members 220 may have a coolant flow path 310 having the same structure as the coolant flow path 310 formed at the sidewalls 303, 304 of the module housing 300.

In addition, the battery pack 600 may further include various devices for controlling the charge and discharge of the cell assembly 100, such as a battery management system (BMS) (not shown), a current sensor (not shown) and a fuse (not shown), in addition to the battery module 400.

In addition, the battery module 400 according to the present disclosure may be applied to a vehicle such as an electric vehicle or a hybrid electric vehicle. That is, the vehicle according to the present disclosure may include the battery module 400.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 110: secondary battery | 100: cell assembly |
| 300: module housing | 301, 302, 303, 304: sidewall |
| 310: coolant flow path | H1: injection hole |
| 320: thermally conductive material | G1: guide groove |
| 330: backflow prevention member | 340: stopper |
| R1: rib structure | 220: flow path connection member |
| 400: battery module | 500: nozzle |
| 600: battery pack | |

INDUSTRIAL APPLICABILITY

The present disclosure relates to a battery module and a battery pack including two or more battery modules. In addition, the present disclosure may be applied to industries associated with a vehicle including the battery pack.

What is claimed is:

1. A battery module, comprising:
a cell assembly having a plurality of secondary batteries; and
a module housing having at least one sidewall extending along a respective plane and configured to accommodate the cell assembly in an interior space defined by the at least one sidewall, the at least one sidewall having two or more coolant flow paths defined within the at least one sidewall between an outer surface and an inner surface of the at least one sidewall, and the at least one sidewall having a rib positioned between the two or more coolant flow paths, the rib extending transverse to the respective plane from the outer surface to the inner surface of the at least one sidewall, and the module housing having at least one injection hole positioned in the outer surface of the at least one sidewall, the at least one injection hole extending within the rib and extending transverse to the respective plane so as to extend to and communicate with the interior space.

2. The battery module according to claim 1, further comprising:
a thermally conductive material disposed in the interior space of the module housing between the cell assembly and an inner surface of the module housing.

3. The battery module according to claim 1,
wherein the at least one sidewall includes a plurality of sidewalls, including an upper wall, a lower wall, a left wall and a right wall,
wherein the two or more coolant flow paths are defined in a first one of the sidewalls, the first one being either the upper wall, the lower wall, the left wall or the right wall, and
wherein the two or more injection holes are located in the first one of the sidewalls where the two or more coolant flow paths are located.

4. The battery module according to claim 1,
wherein the two or more coolant flow paths extend through both a front end and a rear end of the at least one sidewall of the module housing, and
wherein the two or more coolant flow paths have an inlet formed at the front end of the at least one sidewall so that a coolant flows in therethrough and an outlet formed at the rear end of the at least one sidewall so that the coolant flows out therethrough.

5. The battery module according to claim 1,
wherein the module housing further includes a guide groove recessed within an inner surface of the at least one sidewall, the guide groove extending longitudinally along the at least one sidewall.

6. The battery module according to claim 1, further comprising:
two or more backflow prevention members located at an inner surface of the at least one sidewall in which the two or more injection holes are located, the two or more backflow prevention members each having a cover configured to open a respective one of the two or more injection holes only in an inward direction.

7. The battery module according to claim 1,
further comprising two or more stoppers configured to seal the respective two or more injection holes to prevent an external substance from entering the module housing.

8. The battery module according to claim 1, wherein the at least one injection hole includes two or more of the injection holes spaced apart from each other by a predetermined interval along a longitudinal dimension of the module housing, and wherein the two or more of the injection holes are defined within the rib.

9. A battery pack, comprising two or more battery modules according to claim 1.

10. The battery pack according to claim 9, wherein the two or more battery modules are provided such that the two or more coolant flow paths of a first one of the two or more battery modules and the two or more coolant flow paths of a second one of the two or more battery modules are connected to each other.

11. A vehicle, comprising the battery pack according to claim 10.

* * * * *